United States Patent [19]

Sweeney et al.

[11] Patent Number: 4,867,564

[45] Date of Patent: * Sep. 19, 1989

[54] APPARATUS FOR AND METHOD OF REMOTELY SENSING SUB-SURFACE WATER TEMPERATURES

[75] Inventors: Harold E. Sweeney, Menlo Park; Donald A. Leonard, Cupertino, both of Calif.

[73] Assignee: GTE Government Systems Corporation, Stamford, Conn.

[*] Notice: The portion of the term of this patent subsequent to Sep. 19, 2006 has been disclaimed.

[21] Appl. No.: 64,371

[22] Filed: Jun. 22, 1987

[51] Int. Cl.$^4$ .................. G01B 9/02; G01K 11/22
[52] U.S. Cl. .................. 356/349; 356/43; 374/117
[58] Field of Search .......... 356/43, 318, 349; 374/117

[56] References Cited

U.S. PATENT DOCUMENTS 3,474,253 10/1969 Kessler .................. 367/191
4,123,160 10/1978 Caputo et al. .............. 356/301
4,411,525 10/1983 Ogawa .................. 356/339

OTHER PUBLICATIONS

Speed of Sound & Temperature in the Ocean by Brillouin Scattering, by Joseph G. Hirschberg, et al., Applied Optics/vol. 23, No. 15, 8/1/84 pp. 2624–2628, inclusive.

Primary Examiner—Richard A. Rosenberger
Attorney, Agent, or Firm—Douglas M. Gilbert; John F. Lawler

[57] ABSTRACT

The subsurface temperature of a body of water such as an ocean is measured remotely by directing a laser beam deeply into the water and analyzing the resultant Brillouin and Rayleigh backscatter components. Wavelength shifted Brillouin scatter is mixed with the unshifted Rayleigh scatter in a self-heterodyne manner for each volume element of illuminated water and the frequency of the heterodyne signal is measured. This produces the desired temperature-depth profile of the water.

9 Claims, 3 Drawing Sheets

APPARATUS FOR AND METHOD OF REMOTELY SENSING SUB-SURFACE WATER TEMPERATURES

RELATED APPLICATION

Ser. No. 064,375 filed June 22, 1987, "METHOD OF REMOTELY DETECTING SUBMARINES USING A LASER."

BACKGROUND OF THE INVENTION

1 Field of the Invention

The present invention relates to the measurement of sub-surface ocean temperature profiles and more particularly to an improved method of and apparatus for remotely measuring such temperature profiles from an aircraft or the like.

2. Description of the Prior Art

Profiles of ocean water temperature as a function of depth are important basic scientific data used by the oceanographic community for several purposes including determination of the effect on climate. A technique employed in the past for measuring such profiles involves the use of many temperature sensing elements spaced on a cable and towed by a ship. This is costly, time consuming and generally unsuited to high spatial and temporal resolution coverage of large ocean areas. Furthermore, the technique cannot be used for mapping ocean temperature profiles, that is, temperatures over wide areas of water, because the measuring time is too long compared to the time over which sea temperatures vary.

Another technique is described in Patent No. 4,123,160 in which a laser beam is used to illuminate the water and observation is made of the Raman scatter from the monomer and hydrogen bonded polymeric forms of water, the ratio of which is a function of temperature. This technique is vulnerable to interference from high background illumination, such as sunlight, because of the relatively wide optical bandwidth of the Raman scattering. Furthermore, in this technique there is differential absorption over the Raman band as light transits the water column. Depolarization effects of the water column also limit the effectiveness of the technique when polarization spectroscopy is employed.

Still another laser remote sensing method has been used in limited experiments, see "SPEED OF SOUND AND TEMPERATURE IN THE OCEAN BY BRILLOUIN SCATTERING" by Hirschberg, et al., *Applied Optics*, Aug. 1984, pages 2624–2628, inclusive. This method relies on the wavelength shift associated with Brillouin scattering from the water. This shift, however, is small so that extremely high resolution is required in optical measurement of the wavelength shift. Typically a Fabry-Perot interferometer is used to resolve the Brillouin shift. However, an interferometer requires a well collimated light source which generally is incompatible with remote sensing applications, that is, because of spreading, light must be collected from a much larger field of view than is possible with an interferometer.

This invention is directed to the measurement of sub-surface ocean temperatures while avoiding these disadvantages.

OBJECTS AND SUMMARY OF THE INVENTION

A general object of the invention is the provision of a technique of remotely and rapidly measuring ocean temperature profiles without interference from high background illumination, such as sunlight.

Another object is the provision of such measuring apparatus having relatively high overall efficiency.

Still another object is the provision of a method of and apparatus for remotely measuring ocean temperature profiles without the need for a precision interferometer.

A further object is the provision of such a technique and apparatus having relatively high sensitivity.

These and other objects of the invention are achieved by using the "self-heterodyne" of the wavelength-shifted Brillouin scatter with the unshifted Rayleigh scatter mainly from impurities in the water. The "self-heterodyne" action allows mixing of these signals from each volume element of the illuminated water column independently and measuring the frequency of the heterodyne signal. Since this frequency is directly related to the water temperature and since time is directly proportional to depth, the resultant time-temperature pattern is equivalent to a temperature-depth profile.

BRIEF DESCRIPTION OF THE DRAWINGS

For a better understanding of the invention as well as other objects and further features thereof, reference is made to the following description which is to be read in conjunction with the accompanying drawings wherein.

It should be noted that the same reference numerals identify identical components in each of the figures.

DESCRIPTION OF PREFERRED EMBODIMENT

For a better understanding of the subject invention, reference is made to the following description and appended claims in conjunction with the above-described drawings.

Figure 1:
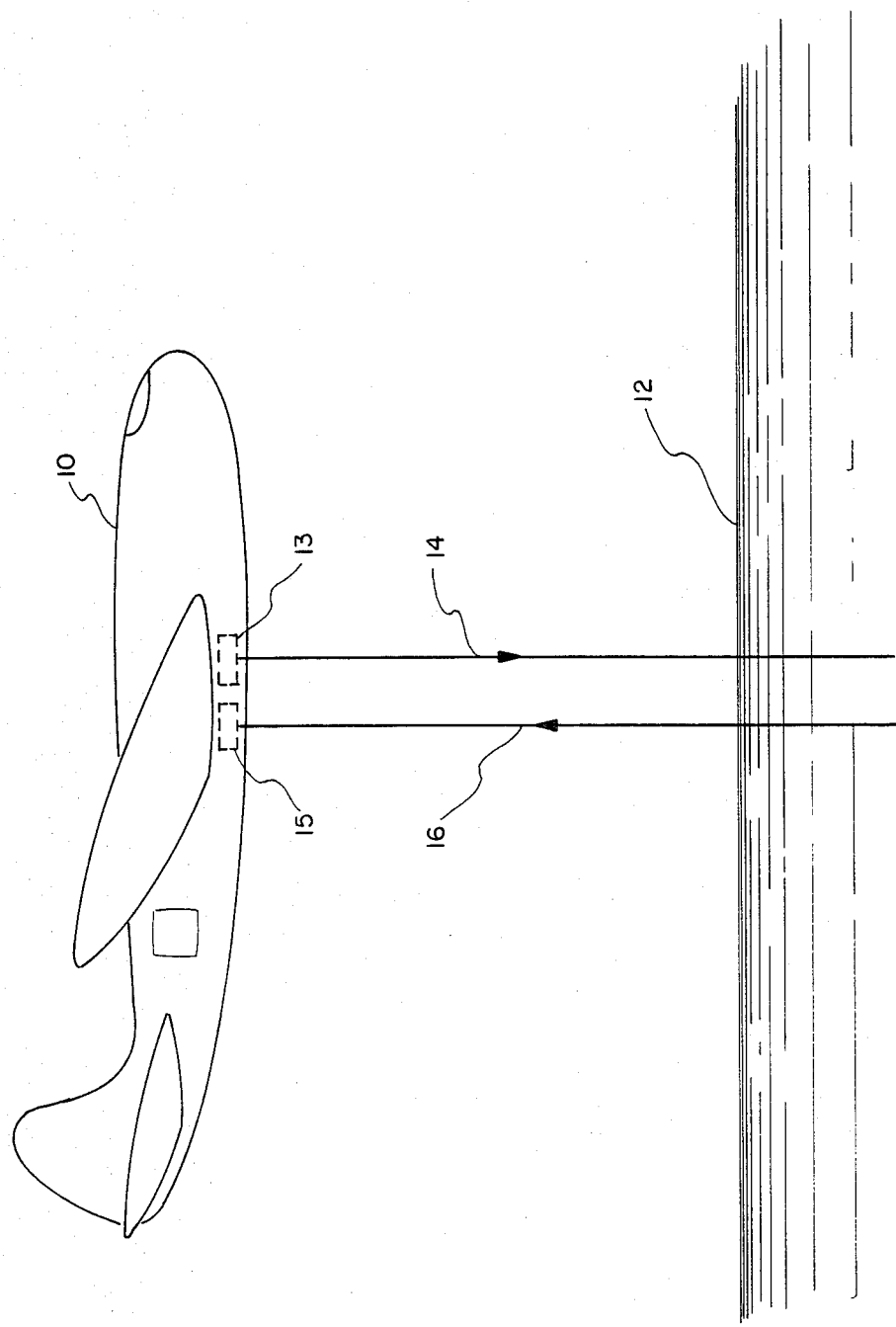
FIG. 1 is a schematic view of an aircraft over a body of water and involved in the practice of the invention.

Referring now to the drawings, FIG. 1 depicts an aircraft 10 in flight at a predetermined altitude over a body 12 of water such as an ocean having a transmitter 13 for directing a laser beam 14 into the water and a receiver 15 for receiving a return signal 16 from the water. Transmitter 13 generates a pulsed output beam 14 having a wavelength selected to penetrate the water 12, and return signal 16 contains Brillouin and Rayleigh backscatter components. In accordance with this invention, receiver 15 processes the Brillouin and Rayleigh signals to produce data indicative of the temperature at various depths to provide temperature-depth information.

Figure 2:
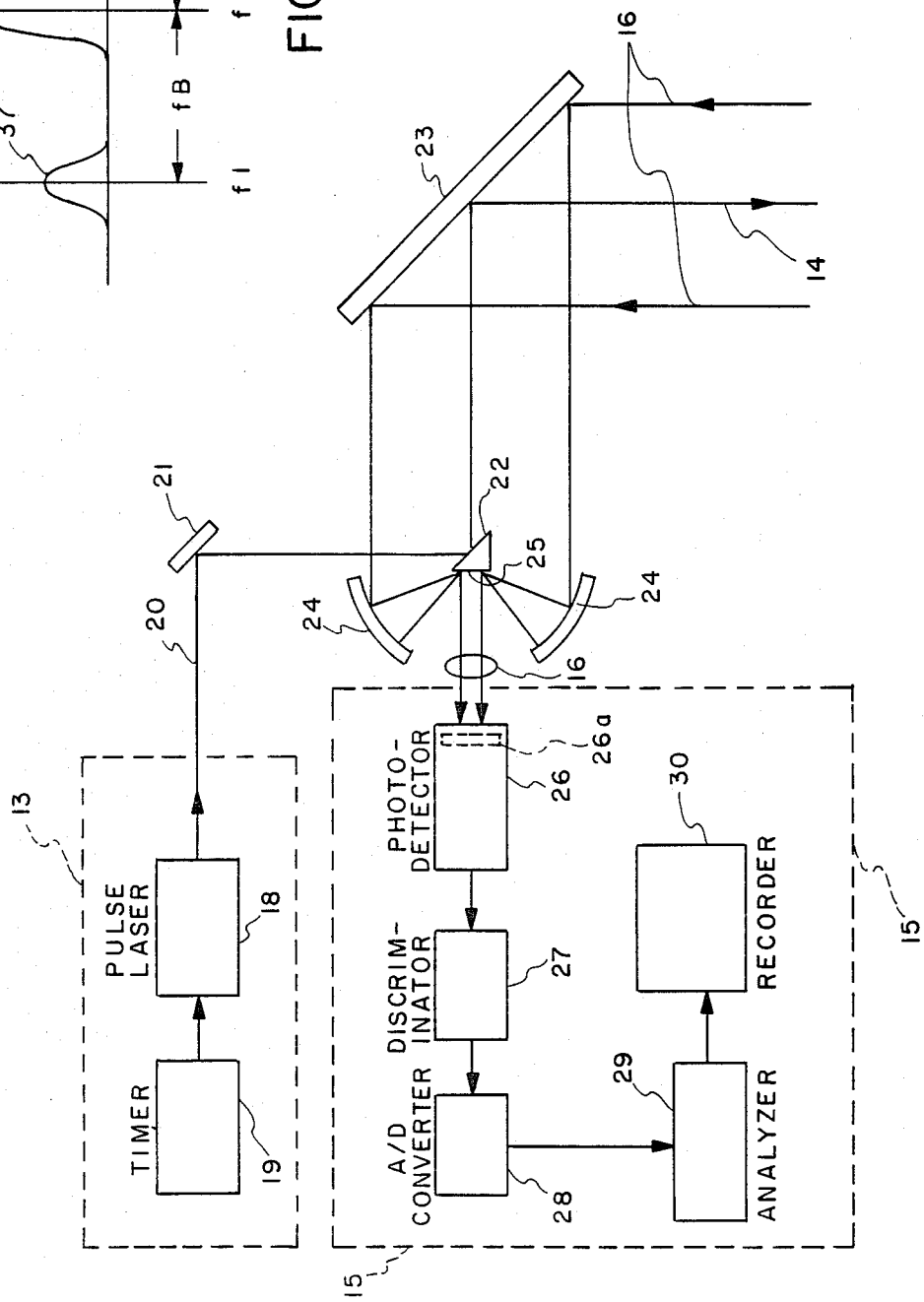
FIG. 2 is a schematic block diagram of the transmitter and receiver components comprising the apparatus embodying the invention.

A more detailed block diagram of transmitter 13 and receiver 15 along with associated optics is shown in FIG. 2. Transmitter 13 comprises a laser 18 controlled by a timer 19 to produce output laser pulses 20. The output of laser 18 preferably is in the blue-green part of the spectrum (4500 to 5500 Å in wavelength) and has a typical pulse repetition frequency of 100 Hz. A laser useful for this purpose is a frequency doubled Nd:YAG at a wavelength of 5300 Å. Laser output 20 is directed by mirrors 21, 22 and 23 to the target area, in this application, the sea water 12 below aircraft 10.

Return signal 16 contains Brillouin and Rayleigh backscatter components resulting from the interaction of the laser pulses with the sea water. Mirrors 23, 24 and 25 direct the return light 16 to the receiver 15 comprising photodetector 26 having a cathode 26a, discriminator 27, analog-to-digital converter 28, analyzer unit 29 and a recorder 30. Phototector 26 preferably is a photomultiplier tube having a photocathode on which the return light 16 is incident. The PM tube converts the optical energy (photons) to electrons (current) while simultaneously amplifying the signal. The photocathode also performs the additional important function of mixing the Brillouin and Rayleigh components of signal 16 to provide a difference frequency, called the optical heterodyne frequency. The Brillouin backscatter component is frequency-shifted by the acoustic properties of the water whereas the Rayleigh backscatter component has a constant frequency and is analogous to the "local oscillator" in a superheterodyne receiver. The acoustic velocity of the water is a function of water temperature.

Figure 3:
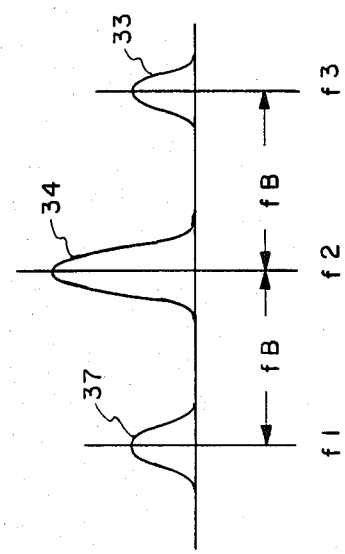
FIG. 3 is a diagram illustrating frequency products resulting from mixing Rayleigh and Brillouin backscatter components in accordance with the practice of the invention.

Referring now to FIG. 3, the Brillouin and Rayleigh components incident on cathode 26a of photodetector 26 are represented by curves 37; and 33 at frequencies $f_1$ and $f_3$, respectively, and by curve 34 at frequency $f_2$. The signals at frequencies $f_1$ and $f_3$ are the frequency shifted Brillouin components, and the signal at $f_2$ is the frequency unshifted Rayleigh component, the latter functioning as a "local oscillator" in an analogy to a superheterodyne receiver. The two difference frequencies between $f_3$ and $f_2$ and between $f_2$ and $f_1$ are the same frequency, $f_B$ and are additive in the baseband so that the process results in increased sensitivity. Moreover, the phase relationship of the Brillouin and Rayleigh components at photodetector 26 is correct for efficient heterodyning since both components are received from the same angle of view however wide and are produced by the same laser pulse stream.

The output (current) of photodetector 26 passes to discriminator 27, such as a delay line discriminator, which produces a voltage proportional to the baseband frequency $f_B$. Converter 28 changes the output of discriminator 27 into digital form for analysis in analyzer 29. Analyzer 29 receives the digital frequency $f_B$ and, using the equations below, translates it into a signal or number representative of the water temperatures. By way of example, analyzer 29 may comprise a computer which compares the digital frequency input with a reference table to derive the equivalent temperature. The output of analyzer 29 is stored in recorder 30.

The accuracy of temperature measurement by analysis of Brillouin backscatter may be shown mathematically. The relation of signal-to-noise ratio (SNR) to the standard deviation of frequency measurement accuracy for a radar is given by the following expression.

$$\text{std dev}(f) = [2\pi T_o \sqrt{(2SNR)}]^{-1} \quad (1)$$

This standard deviation of the frequency also depends on a parameter $T_o$ which is usually taken to be the laser pulse width. In this case, however, the self broadening of the Brillouin shifted lines produces a Brillouin bandwidth of 480 MHz (See Hirschberg, J. G., et al, "SPEED OF SOUND AND TEMPERATURE IN THE OCEAN BY BRILLOUIN SCATTERING," *Applied Optics*, 23, 2624 (1984)). This requires that an effective $T_o$ of 2.1 ns be used in equation (1) rather than the laser pulse duration.

The Brillouin backscatter frequency $f_B$ is a function of the acoustic velocity $v_s$ and the laser optical frequency, $f_o$, as follows $$f_B = 2nv_s(1/c)f_o \quad (2)$$

where n is the index of refraction and c is the velocity of light in free space. Differentiating equation (2) with respect to temperature yields $$df_B/dT = 2n(1/c)f_o(dv_s/dT) \quad (3)$$

The sound velocity vs is given as a function of temperature by the following expression.

$$v_s = 1400 + 5.02T - 0.0557T^2 + 0.003T^3 \quad (4)$$

which, when differentiated with respect to temperature and evaluated at 10° C., gives $dv_s/dT = 4.82$ m/s−° C. Substituting this value into equation (3) and using $6.54 \times 10^{14}$ Hz as the optical frequency for an assumed transmitter wavelength of 459 nm, the result obtained is $$df_B/dT = 27.95 \text{ MHz/° C.} \quad (5)$$

Figure 4:
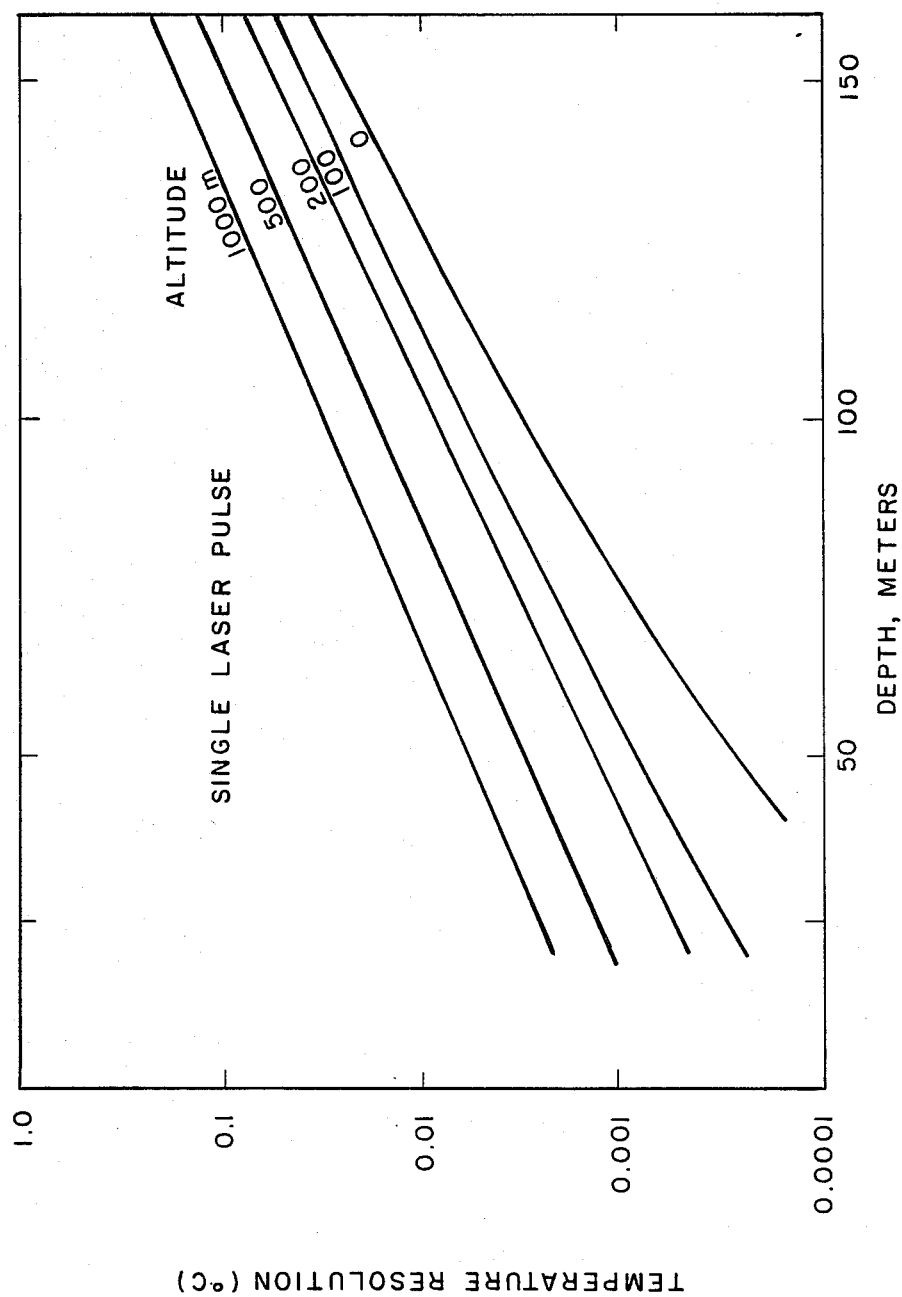
FIG. 4 is a set of curves depicting the relation of ocean temperature resolution and depth for different monitoring altitudes.

The temperature accuracy as a function of SNR can be obtained by dividing equation (1) by $df_b/dT$. The resultant temperature accuracy expressed as a function of depth for a representative system is shown in FIG. 4.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method of measuring a subsurface property of a body of water from a remote location comprising the steps of:
    generating a beam of laser light capable of penetrating said water;
    directing said beam into said water;
    detecting the Rayleigh and Brillouin backscatter light produced by the interaction of said beam with said water;
    mixing said Rayleigh and Brillouin light and thereby producing a heterodyne current having a frequency $f_B$; and
    measuring the frequency of said heterodyne current for determining said property of said water.

2. The method according to claim 1 with the step of scaling the frequency measurements with time and producing property depth profile of said body of water.

3. The method according to claim 2 in which said property is temperature.

4. The method according to claim 3 in which said laser beam is pulsed.

5. The method according to claim 4 in which said pulsed laser beam is in the blue-green region of light.

6. The method according to claim 5 in which said remote location is an airplane traveling above the body of water.

7. The method according to claim 5 in which said remote location is a ship located on the surface of said body of water.

8. The method according to claim 6 in which said measuring step comprises the steps of:
   converting said heterodyne current to a signal voltage proportional to $f_B$;
   periodically digitizing said signal voltage and generating digitized signal samples; and
   translating each of said digitized signal samples into a number corresponding to a temperature value.

9. Apparatus for measuring the subsurface temperature of a body of water from a remote location comprising:
   means for generating a beam of laser light adapted to penetrate deeply into said body of water;
   means for detecting components of the Brillouin backscatter produced by said beam;
   means for detecting components of the Rayleigh backscatter produced by said beam;
   means for mixing said components of the Brillouin and Rayleigh backscatter and thereby producing an output heterodyne current having a frequency $f_B$; and
   means for measuring said frequency for determining the temperature of said body of water.

* * * * *